July 6, 1965   J. L. SMITH, JR   3,193,760
AIR PRESSURE SENSITIVE BRIDGE
Filed April 28, 1961

INVENTOR.
JULIUS L. SMITH JR.
BY
ATTORNEY 3,193,760
AIR PRESSURE SENSITIVE BRIDGE
Julius L. Smith, Jr., Richardson, Tex., assignor to Collins Radio Company, Cedar Rapids, Iowa, a corporation of Iowa
Filed Apr. 28, 1961, Ser. No. 106,395
2 Claims. (Cl. 323—75)

This invention relates in general to an air pressure sensitive bridge, and in particular to an apparatus which is responsive to minute pressure variations and capable of producing an electrical output. It is often desirable to measure minute pressure changes, as for example in altimeters, wherein changes in altitude result in pressure changes due to rarefication of air with altitude. Also, microphones for the conversion of pressure changes into electrical energy require transducers.

It is an object of this invention, therefore, to provide a transducer for converting pressure changes into electrical energy.

It is another object of this invention to provide improved, efficient transducers capable of converting pressure changes to electrical energy with a high degree of efficiency.

A feature of this invention is found in the provision for a condenser with air dielectric between its plates in which the capacitance varies in response to pressure and a detecting circuit capable of detecting the capacitance changes due to the dielectric change.

Figure 1:
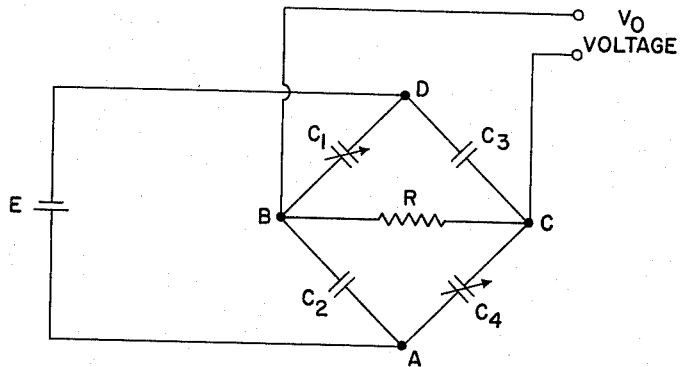
Figure 2:
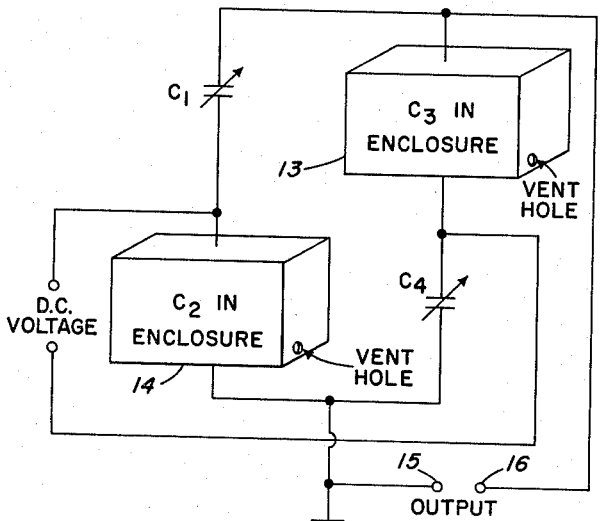

Further objects, features, and advantages of the invention will become apparent from the following description and claims when read in view of the accompanying drawings, in which:

FIGURE 1 illustrates a capacitor utilizing a compressible dielectric such as air which has a dielectric constant which varies with pressure; and FIGURE 2 illustrates a bridge circuit for detecting dielectric changes and producing an electrical output.

A condenser with a suitable dielectric, as for example air or other material, which varies as a function of pressure, produces a pressure sensitive device. For example, the dielectric constant of air is 1.000590 at normal atmospheric pressure. Normal atmospheric pressure is $10^6$ dynes/cm.$^2$. The human ear can detect an audible sound which has a pressure differential of 1 dyne/cm.$^2$. Thus, a barely audible sound will cause the dielectric constant of an air mass to vary with peak values of $1.000590 + 10^{-6}$. An air dielectric capacitor of capacity $C$ at normal pressure, when subjected to a barely audible sound of 1 dyne/cm.$^2$ will have a capacity of $C(1+10^{-6})$. By detecting the changes in capacitance of a capacitor, changes in pressure can be detected. To utilize this principle, the apparatus of FIGURE 1 may be used.

FIGURE 1 illustrates a battery $E$ which has its terminals connected to points A and D of a capacitive bridge. The capacitive bridge has four capacitors $C_1$, $C_2$, $C_3$, and $C_4$ which are connected as shown, and has a load resistor which is very large connected between points B and C. Condensers $C_2$ and $C_3$ may be sealed condensers so that pressure variations do not affect their dielectric constants. Condensers $C_1$ and $C_4$ may be open air dielectric capacitors and are subjected to capacitance changes with pressure changes.

Condensers $C_1$, $C_2$, $C_3$, and $C_4$ are selected so as to have equal capacitance at normal pressure, and no potential difference appears between points B and C. When pressure variations are impressed upon $C_1$ and $C_4$ (being withheld from $C_2$ and $C_3$ the bridge is unbalanced and a potential difference corresponding to the pressure variation appears from B to C. An increase in pressure causes an increase in capacity of $C_1$ and $C_4$ resulting in point B becoming more negative with respect to point A. Also, point C becomes more positive under this same stimulus with a net result of a potential difference due to the pressure variation across B to C from which an output may be taken. Since condensers $C_2$ and $C_3$ are sealed and shielded from the pressure differential, their capacitance does not change.

The transducer of this invention has a uniform frequency response in that it is free from mechanical diaphragms and mechanical resonances. The peak output voltage for a 1 dyne/cm.$^2$ pressure variation is calculated as follows:

The potential from A to B, called $V_{AB}$, under normal pressure is $$V_{AB} = E\left[\frac{C_1}{C_1+C_2}\right]$$

The potential from A to C, called $V_{AC}$ under normal pressure is $$V_{AC} = E\left[\frac{C_3}{C_3+C_4}\right]$$

The output voltage is $V_{AB} - V_{AC}$, called $V_0$ $$V_0 = E\left[\frac{C_1}{C_1+C_2} - \frac{C_3}{C_3+C_4}\right]$$

Under normal pressure $V_0 = 0$ because $C_1$, $C_2$, $C_3$, and $C_4$ are all equal. If the pressure increases 1 dyne/cm.$^2$ above normal, the capacitance of $C_1$ and $C_4$ increases to $C(1+10^{-6})$ and the output voltage becomes:

$$V_0^1 = E\left[\frac{C(1+10^{-6})}{C(1+10^{-6})+C} - \frac{C}{C+C(1+10^{-6})}\right]$$

$$V_0^1 = E\left[\frac{10^{-6}}{2+10^{-6}}\right]$$

$$V_0^1 \approx \frac{E \times 10^{-6}}{2}$$

If $E=2000$ volts, $V_0^1$ will be 1 millivolt, which is an adequately large signal for amplification.

The apparatus shown in FIGURE 2 comprises a bridge circuit wherein the condensers $C_2$ and $C_3$ are enclosed in housings 13 and 14 which have small pin hole leaks that allow the enclosures to be vented for response to variations in pressure which exist a long time. Such vents allow pressure changes due to temperature changes, for example, to occur in the housings. One housing can contain both of these condensers if desired. Condensers $C_1$ and $C_4$ have air dielectrics and are not surrounded by a housing, and respond to pressure variations in the dielectric.

Such an arrangement can be used as a microphone to produce at the output terminals 15 and 16 a signal which varies with audible sound striking condensers $C_1$ and $C_4$, or it might be used as an altimeter to measure variations in pressure caused by altitude changes provided no vent holes are provided in the enclosures.

It is seen that this invention provides for converting pressure changes into electric signals and although it has been described with respect to preferred embodiments thereof, it is not to be so limited, as changes and modifications may be made therein which are within the spirit and scope of the invention as defined by the appended claims.

1. A pressure transducer comprising four condensers with gaseous dielectric, said condensers connected in a bridge circuit, two said condensers one each opposite branches of said bridge, being immune to pressure variations, the other two condensers in the other opposite branches of said bridge having dielectric constants which vary with changes in pressure, a voltage source connected to said bridge circuit, and an output removed from said bridge circuit proportional to pressure deviations.

2. A pressure transducer comprising four condensers, said condensers connected in a bridge circuit, two of said condensers, one each in opposite branches of said bridge, being immune to pressure variations, the other two condensers in the other opposite branches of said bridge having dielectric constants which vary with changes in pressure, said other two condensers being mounted in a housing which has a small opening that allows pressure variations that exist a long time between the inside and outside of the housing to equalize, a voltage source connected to said bridge circuit, and an output removed from said bridge circuit proportional to pressure deviations.

References Cited by the Examiner

UNITED STATES PATENTS

| | | | |
|---|---|---|---|
| 2,614,416 | 10/46 | Hollmann | 317–246 |
| 2,714,703 | 8/55 | Ruderfer | 323—93 X |
| 2,773,137 | 12/56 | Hollmann | 323—93 X |
| 2,996,915 | 8/61 | Greenwood et al. | 323—75 X |
| 3,031,616 | 4/62 | Hummel | 324—61 |
| 3,077,561 | 2/63 | Revesz | 323—75 X |

LLOYD McCOLLUM *Primary Examiner.*

MILTON O. HIRSHFIELD, *Example.*

UNITED STATES PATENT OFFICE
CERTIFICATE OF CORRECTION

Patent No. 3,193,760                                                 July 6, 196

Julius L. Smith, Jr.

It is hereby certified that error appears in the above numbered patent requiring correction and that the said Letters Patent should read as corrected below.

Column 2, line 66, after "two" insert -- of --; same line 66, after "condensers" insert a comma.

Signed and sealed this 30th day of November 1965.

(SEAL)
Attest:

ERNEST W. SWIDER                                   EDWARD J. BRENNER
Attesting Officer                                          Commissioner of Patents